United States Patent Office 3,530,102
Patented Sept. 22, 1970

3,530,102
TERPOLYMERS OF MALEIC ANHYDRIDE, VINYL ALKYL ETHER AND DIVINYLBENZENE AND PROCESS FOR PRODUCTION THEREOF
Frank J. Welch, Charleston, and Herbert J. Paxton, Jr., Elkview, W. Va., assignors to Union Carbide Corporation, a corporation of New York
No Drawing. Filed May 16, 1968, Ser. No. 729,516
Int. Cl. C08f 1/60, 1/90, 19/20
U.S. Cl. 260—78.5                    6 Claims

ABSTRACT OF THE DISCLOSURE

Polymeric thickening agents, effective in both aqueous and organic systems, composed of an alternating equimolar high molecular weight copolymer of maleic anhydride and a vinyl alkyl ether crosslinked with a small amount of divinylbenzene. High molecular weight and consequent ability to thicken effectively with a minimum degree of crosslinking is achieved by effecting the polymerization with the vinyl alkyl ether in large molar excess relative to the maleic anhydride.

---

This invention relates to novel polymeric compositions useful as thickening agents. More particularly, this invention relates to polymeric thickening agents composed of an alternating equimolar copolymer of maleic anhydride and a vinyl alkyl ether crosslinked with a minor amount of divinylbenzene and to a process for their preparation.

Maleic anhydride and vinyl alkyl ethers polymerize in the presence of a free-radical catalyst to form anequimolar alternating copolymer i.e. a linear copolymer consisting of alternating vinyl ether and maleic anhydride units, regardless of the proportion of each monomer in the reaction system. Such copolymers have been known for many years and, as such, or in the form of their hydrolysis products, have been employed in a variety of applications, for example, as adhesives, as dyeing assistants, in the treatment of leather and textiles, and so forth. The preparation of terpolymers in which the alternating equimolar copolymer of maleic anhydride and vinyl alkyl ether is crosslinked with a polyunsaturated crosslinking agent is also known and it has been proposed to utilize such terpolymers, or the salts, esters, or amides thereof, as emulsifiers, as suspending agents, and as thickeners.

It has now been discovered that crosslinked terpolymers which are remarkably effective thickening agents can be prepared by polymerizing maleic anhydride and a vinyl alkyl ether under conditions which lead to the formation of a very high molecular weight product and crosslinking the copolymer with a critical proporiton of divinylbenzene. More specifically, it has been found that by polymerizing maleic anhydride and a vinyl alkyl ether in a molar ratio of vinyl alkyl ether to maleic anhydride of at least about 2 to 1 and crosslinking with divinylbenzene in an amount providing a molar ratio of divinylbenzene to maleic anhydride of from about 0.001 to about 0.04, the resulting crosslinked terpolymer is a highly effective thickening agent capable of functioning in aqueous systems and also in certain organic systems.

The vinyl alkyl ethers which may be employed in preparing the thickening agents of this invention are compounds of the formula:

wherein R is a radical containing 1 to 10 carbon atoms selected from the group consisting of alkyl, haloalkyl and alkoxyalkyl. Specific examples of vinyl alkyl ethers of the above formula include methyl vinyl ether, vinyl ethyl ether, n-propyl vinyl ether, isopropyl vinyl ether, n-butyl vinyl ether, isobutyl vinyl ether, n-hexyl vinyl ether, n-octyl vinyl ether, 2-ethylhexyl vinyl ether, n-decyl vinyl ether, 2-chloroethyl vinyl ether, 2-methoxyethyl ether, 2-butoxyethyl vinyl ether, 2-(2-ethoxyethoxy)ethyl vinyl ether, and the like.

The crosslinked terpolymers of this invention are alternating equimolar copolymers of maleic anhydride and a vinyl alkyl ether of the formula given hereinabove, crosslinked with divinylbenzene in an amount of from about 0.001 to about 0.04 mole per mole of maleic anhydride in the copolymer, and preferable from about 0.005 to about 0.02 mole per mole of maleic anhydride. The crosslinked terpolymers exhibit a viscosity in aqueous solution when neutralized with sodium hydroxide to a pH of 6 to 7 of at least 8600 centipoises at 0.2 weight percent concentration or at least 28,600 centipoises at 0.5 weight percent concentration. These viscosities are measured with a model R.V.F. Brookfield viscometer at 20 r.p.m. using the appropriate spindle which will yield a dial deflection of 15° or greater at ambient temperature.

To prepare the crosslinked terpolymers of this invention, the maleic anhydride, vinyl alkyl ether and divinylbenzene are admixed in such proportion as to provide a molar ratio of vinyl alkyl ether to maleic anhydride of at least about 2 to 1, and more preferably at least about 5 to 1 and a molar ratio of divinylbenzene to maleic anhydride of from about 0.001 to about 0.04, preferably about 0.005 to about 0.02, and the resulting admixture is contacted with a free-radical polymerization catalyst for a period sufficient to form the crosslinked polymer. Under these conditions substantially all of the maleic anhydride, i.e. about 98 percent or more, is converted to polymer, and similarly, substantially all of the divinylbenzene, i.e. about 98 percent or more, reacts to form crosslinks, so that the resulting terpolymer will consist of equimolar proportions of maleic anhydride and vinyl alkyl ether, with divinylbenzene present in the terpolymer in substantially the same proportion to maleic anhydride as that in the reaction mixture. Thus, for example, where the reaction mixture contains one mole of maleic anhydride, two moles of vinyl alkyl ether, and 0.01 mole of divinylbenzene, the resulting terpolymer will consist essentially of one mole of maleic anhydride, one mole of vinyl alkyl ether, and 0.01 mole of divinylbenzene.

The ploymerization process can be conducted at temperatures of from about 0° C., or less, to about 150° C., or more, with the preferred temperature range being from about 35° C. to about 100° C. Pressures may range from sub-atmospheric to superatmospheric.

Any of the conventional free-radical polymerization catalysts may be employed to effect the polymeriztaion. For example, the catalyst may be azobisisobutyronitrile, isopropylperoxydicarbonate, t-butylperoxy pivalate, acetyl peroxide, benzoyl peroxide, lauroyl peroxide, and the like. The catalyst may be employed in any catalytically effective amount, usually from about 0.05 to about 1 percent based on the total weight of reacting monomers.

The polymerization may be effected without a diluent, i.e. by utilizing the excess vinyl alkyl ether as the polymerization medium, or with the aid of an inert organic diluent. The diluent should be a non-solvent for the polymer but should be a solvent for the maleic anhydride and for the free-radical catalyst. Examples of suitable diluents are cycloaliphatic hydrocarbons such as cyclopentane, cyclohexane, methylcyclopentane and methylcyclohexane; aromatic hydrocarbons such as benzene, toluene and xylene; halogenated hydrocarbons such as n-butyl chloride and ethylene dichloride; ethers such as diethyl ether, and so forth. The aforesaid compounds may be employed alone or as mixtures. Moreover, mixtures of these compounds with compounds, such as hexane and heptane, which are non-solvents for maleic anhydride may also be employed if desired.

The particular manner in which the polymerization process is carried out is not critical as long as the necessary ratio of vinyl alkyl ether to maleic anhydride is maintained throughout substantially the entire polymerization and the necessary amount of divinylbenzene is ultimately incorporated. Thus, the entire amount of each of the components may be admixed and the resulting mixture heated to effect polymerization. Alternately, a portion of the maleic anhydride may be charged initially and after polymerization has proceeded to some extent the remainder may be added, either all at once or in several increments. Still another suitable procedure is to feed the maleic anhydride continuously to the system over a period of several hours. All of the free-radical catalyst may be charged to the system initially, or it may be added in increments, or it may be dissolved in the diluent and fed slowly to the system. A similar procedure may be followed with regard to the divinylbenzene. Where the excess vinyl alkyl ether is utilized as the polymerization medium, the maleic anhydride is added in molten form; whereas when an inert diluent is employed the maleic anhydride can be charged in the form of a solution in the diluent. Regardless of the manner in which the monomers are added, the polymerization should be conducted in an inert atmosphere and in the absence of moisture.

The preferred manner of carrying out the process of this invention is to slowly feed the maleic anhydride to the polymerization system as this facilitates control over the very rapid and exothermic polymerization reaction.

The two critical aspects of the process of this invention are the requirement that the polymerization be effected with a molar ratio of vinyl alkyl ether to maleic anhydride of at least about 2 to 1 and the requirement that the amount of divinylbenzene incorporated in the polymer be within the range hereinbefore specified. The use of excess vinyl alkyl ether results in the formation of a high molecular weight polymer. Thus, for example, polymerizing vinyl ethyl ether and maleic anhydride in a molar ratio of at least 2 to 1 provides a high molecular weight copolymer with a reduced viscosity of 5 or more as measured at a concentration of 0.2 percent of polymer in acetone at 30° C. As a result of this high molecular weight, the crosslinked polymer has a greatly increased thickening efficiency as compared with a similar crosslinked polymer of lower molecular weight, such as the polymer produced by reacting equimolar amounts of vinyl ethyl ether and maleic anhydride and the crosslinking with divinylbenzene. In addition to utilizing polymerization conditions giving rise to formation of a high molecular weight polymer, to produce the remarkably effective thickening agents of this invention it is essential to employ a concentration of divinylbenzene within the range hereinbefore disclosed. Use of a lesser amount of divinylbenzene than that specified will result in the formation of a resin which is partially soluble in water, while use of a greater amount of divinylbenzene than that specified will result in a highly crosslinked polymer that is incapable of swelling appreciably upon addition to water or other liquid medium. Both of these conditions result in poor thickening efficiency.

For use as a thickening agent, the crosslinked terpolymer is partially neutralized with an inorganic base such as sodium hydroxide or potassium hydroxide or with an amine such as triethylamine or diisopropanolamine. This results in formation of a microgel structure with each microgel being capable of imbibing tremendous volumes of water, or certain organic liquids, with the result that it swells enormously when added thereto. The swollen microgels provide a system which exhibits many desirable features unattainable with a true polymer solution, such as extremely high viscosity at very low concentrations, good gel character, and excellent retention of solution viscosity at elevated temperatures.

The crosslinked terpolymers of this invention are useful as thickening agents in aqueous systems, e.g. in pure water, in mixtures of water and ethanol, and in mixtures of water and isopropanol, and also in certain organic systems such as in methanol and in dimethyl sulfoxide. If the thickener is to be used in alcoholic media, it is preferable to effect neutralization with an amine. The thickening agents of this invention find particular utility in cosmetic and pharmaceutical formulations.

The invention is further illustrated by the following specific examples of its practice.

EXAMPLES 1–10

In each of Examples 1 to 10 the monomers, diluent and catalyst were added to a flask which had been thoroughly purged with nitrogen and the flask was then sealed and heated at the indicated temperature for the period specified. The polymeric product was recovered by filtering and then washed, dried, and weighed. The process conditions and yield of crosslinked terpolymer obtained are summarized for convenience in Table I below. In each case, a portion of the crosslinked terpolymer was dispersed in distilled water at the concentration indicated in Table II and then aqueous sodium hydroxide was added in an amount sufficient to give the indicated pH. The dispersion was agitated for a period of from several hours to 3 days to effect hydrolysis and partial neutralization. Viscosity values were then measured with a Model R.V.F. Brookfield viscometer. The results obtained are summarized for convenience in Table II.

TABLE I

| Example No. | Maleic anhydride (gms.) | Vinyl ethyl ether (gms.) | Divinyl-benzene [1] (gms.) | Molar ratio Vinyl ethyl ether to maleic anhydride | Molar ratio Divinyl-benzene to maleic anhydride | Diluent Compound | Diluent Amount (gms.) | Catalyst Compound | Catalyst Amount (gms.) | Temp. (° C.) | Time (hrs.) | Yield (gms.) |
|---|---|---|---|---|---|---|---|---|---|---|---|---|
| 1 | 98 | 361 | 2.1 | 5 | 0.0089 | Benzene | 1,575 | [2] | 0.42 | 50 | 7 | 175 |
| 2 | 68.6 | 245 | 2.8 | 5 | 0.017 | ...do... | 1,050 | [2] | 0.28 | 50 | 16 | 131 |
| 3 | 98 | 361 | 6.3 | 5 | 0.027 | ...do... | 1,575 | [2] | 0.42 | 50 | 7 | 163 |
| 4 | 98 | 361 | 8.8 | 5 | 0.037 | ...do... | 1,575 | [2] | 0.42 | 50 | 7 | 166 |
| 5 | 9.8 | 7.2 | 0.63g | 1 | 0.05 | ...do... | 160 | [2] | 0.04 | 55 | 24 | 15.3 |
| 6 | 9.8 | 14.4 | 0.63 | 2 | 0.05 | ...do... | 160 | [2] | 0.04 | 55 | 24 | 16.5 |
| 7 | 9.8 | 21.6 | 0.63 | 3 | 0.05 | ...do... | 160 | [2] | 0.04 | 55 | 24 | 16.8 |
| 8 | 9.8 | 28.8 | 0.63 | 4 | 0.05 | ...do... | 160 | [2] | 0.04 | 55 | 24 | 16.7 |
| 9 | 9.8 | 36.0 | 0.63 | 5 | 0.05 | ...do... | 160 | [2] | 0.04 | 55 | 24 | 16.5 |
| 10 | 9.8 | [3] 29.0 | 0.63 | [3] 5 | 0.05 | ...do... | 160 | [2] | 0.04 | 55 | 24 | 14.7 |

[1] Values given are total weight of divinylbenzene of 50 to 60% purity.
[2] Azobisisobutyronitrile.
[3] Vinyl methyl ether.

TABLE II

| Example Number | Concentration of Polymer (weight percent) | pH | Spindle Number | R.p.m. | Viscosity (centipoises) |
|---|---|---|---|---|---|
| 1 | 0.20 | 7.0 | 4 | 20 | 18,000 |
|   | 0.50 | 7.0 | 4 | 20 | 28,800 |
| 2 | 0.20 | 7.0 | 4 | 20 | 22,000 |
|   | 0.50 | 7.0 | 4 | 20 | 50,000 |
| 3 | 0.20 | 7.0 | 4 | 20 | 11,000 |
|   | 0.50 | 7.0 | 4 | 20 | 51,000 |
| 4 | 0.5 | 7.0 | 4 | 20 | 29,500 |
| 5 | 0.2 | 6.2 | 3 | 20 | <100 |
|   | 0.5 | 6.2 | 3 | 20 | 640 |
| 6 | 0.2 | 6.0 | 7 | 20 | 8,600 |
|   | 0.5 | 6.0 | 7 | 20 | 29,600 |
| 7 | 0.2 | 6.0 | 7 | 20 | 20,700 |
|   | 0.5 | 6.0 | 7 | 20 | 45,600 |
| 8 | 0.2 | 6.0 | 7 | 20 | 25,000 |
|   | 0.5 | 6.0 | 7 | 20 | 63,000 |
| 9 | 0.2 | 6.0 | 7 | 20 | 28,700 |
|   | 0.5 | 6.7 | 7 | 20 | 59,800 |
| 10 | 0.2 | 7.0 | 7 | 20 | 35,300 |
|   | 0.5 | 7.0 | 7 | 20 | 59,400 |

EXAMPLE 11

To a nitrogen purged 3-liter resin flask there was added 41.2 grams maleic anhydride, 368 grams vinyl ethyl ether, 1.7 grams divinylbenzene (50 to 60% purity), 1330 grams benzene and 0.42 gram azobisisobutyronitrile. The contents of the flask were heated at 50° C. for a period of 3 hours and then a solution consisting of 446 grams benzene, 61.7 grams maleic anhydride, and 2.5 grams divinylbenzene (50 to 60% purity) was slowly fed to the flask over a period of 4.5 hours while maintaining the temperature at 50° C. (Molar ratio of vinyl ethyl ether to maleic anhydride of 5 and of divinylbenzene to maleic anhydride of 0.018). After heating for an additional 3.5 hours at 50° C., the polymer was recovered by filtering, washed and dried. The yied of polymer was 160 grams.

EXAMPLE 12

A 100-gallon glass-lined autoclave, equipped with a reflux condenser and jacketed to permit circulation of heating fluid, was charged with 11.53 lbs. of maleic anhydride, 84.72 lbs. of vinyl ethyl ether, 233 lbs. of benzene, 1.038 lbs. of divinyl benzene (50–60% purity) and 0.0346 lb. azobisisobutyronitrile. The mixture was heated to reflux, about 60° C., and the jacket temperature was adjusted to 78° C. to maintain a moderate reflux return to the autoclave. An induction period of less than 1 hour was observed. About 1.5 hours after the presence of polymer was first detected, two feed streams were started, the first stream being fed to the autoclave at the rate of 19.2 lbs. per hour and consisting of a mixture of 46.1 parts by weight of benzene to 11.53 parts of maleic anhydride and the second stream being fed to the autoclave at the rate of 7.3 lbs. per hour and consisting of 13.5 parts benzene to 1.037 parts divinylbenzene (50–60% purity). The first stream was added for a total of 3 hours and the second for a total of 2 hours. (Molar ratio of vinyl ethyl ether to maleic anhydride of 5 and of divinylbenzene to maleic anhydride of 0.037). After all feed had been added, refluxing was continued for an additional 2 hours and then 0.039 lb. of 2,2-methylene bis(4-methyl-6-tertiarybutyl phenol dissolved in benzene was added as a stabilizer. After cooling to 30° C. the resin was recovered by centerfuging and dried at 80° C. and an absolute pressure of 10 mm. of mercury. A total of 39.5 lbs. of resin was recovered. A 0.2 weight percent solution of the resin in sodium hydroxide at a pH of 7 exhibited a viscosity in excess of 10,000 as measured with a Brookfield viscometer at 25° C. using a No. 4 spindle at 20 r.p.m.

EXAMPLE 13

A suspension of 0.6 gram of the crosslinked polymer of Example 2 in 300 grams of distilled water was added to a 500 ml. flask and heated with constant stirring for a period of 30 minutes during which time most of the polymer dissolved. Upon cooling to 25° C. the polymer suspension had a viscosity of 10 centipoises (No. 2 spindle at 60 r.p.m.) and a pH of 3.3. A 10 percent solution of sodium hydroxide was then added dropwise and periodic viscosity determinations were made. Results obtained were as follows:

| pH | Spindle Number | R.p.m. | Viscosity (centipoises) |
|---|---|---|---|
| 3.3 | 2 | 60 | 10 |
| 4.4 | 4 | 60 | 1,450 |
| 5.5 | 4 | 60 | 5,350 |
| 7.6 | 4 | 60 | 3,400 |
| 9.1 | 4 | 60 | 2,700 |
| 10.4 | 4 | 60 | 1,550 |
| 11.2 | 4 | 60 | 560 |

EXAMPLE 14

A suspension of 3.0 grams of the crosslinked polymer of Example 2 in 300 grams of methanol was shaken at room temperature for 4 hours during which time most of the polymer dissolved. The viscosity was found to be 8 centipoises (No. 2 spindle at 60 r.p.m.). To 83 grams of this suspension, triethylamine was added in the amounts indicated below and the viscosity was determined. Results obtained were as follows:

| Amount of Triethylamine (ml.) | Spindle Number | R.p.m. | Model LVT Viscometer Viscosity (centipoises) |
|---|---|---|---|
| 0.2 | 4 | 6 | 48,000 |
| 0.2 | 4 | 60 | (1) |
| 0.4 | 4 | 6 | 81,500 |
| 0.4 | 4 | 30 | (1) |
| 0.4 | 4 | 60 | (1) |
| 0.6 | 4 | 6 | >100,000 |
| 1.5 | 4 | 6 | >100,000 |
| 3.0 | 4 | 6 | 95,000 |
| 4.0 | 4 | 6 | 97,000 |
| 7.0 | 4 | 6 | 60,000 |
| 8.0 | 4 | 6 | 86,000 |
| 10.0 | 4 | 6 | 55,000 |

1 Off scale.

EXAMPLE 15

A suspension of 4.0 grams of the crosslinked polymer of Example 2 in 390 grams of distilled water and 5 grams of isopropanol was added to a steam jacketed 500 ml. flask and heated with constant stirring for a period of 30 minutes during which time most of the polymer dissolved. Upon cooling to 25° C., the polymer suspension had a viscosity of 14250 centipoises (No. 4 spindle at 6 r.p.m.) and a pH of 2.9. Upon addition of 2.0 ml. of 10 percent sodium hydroxide solution the pH increased to 6.55 and the viscosity exceeded 2,000,000 centipoises (No. 4 spindle at 0.3 r.p.m.).

EXAMPLE 16

A suspension of 4.0 grams of the crosslinked polymer of Example 11 in 390 grams of distilled water and 5 grams of isopropanol was added to a steam jacketed 500 ml. flask and heated with constant stirring for a period of 30 minutes during which time most of the polymer dissolved. Upon cooling to 25° C., the polymer solution had a viscosity of 7700 centipoises (No. 2 spindle at 60 r.p.m.) and a pH of 2.55. Upon addition of 2.0 ml. of 10 percent sodium hydroxide solution the pH increased to 6.2 and the viscosity was as follows:

| Spindle Number | R.p.m. | Viscosity (centipoises) |
|---|---|---|
| 4 | 6 | 56,250 |
| 4 | 12 | 33,750 |
| 4 | 30 | 17,700 |

Although the invention has been described in terms of specific examples which are set forth in considerable detail, it is to be understood that this is by way of illustration only and that variations and modifications that will

What is claimed is:

1. A polymeric thickening agent consisting of an alternating equimolar copolymer of maleic anhydride and a vinyl alkyl ether of the formula:

$$CH_2=CH-O-R$$

wherein R is a radical containing 1 to 10 carbon atoms selected from the group consisting of alkyl, haloalkyl and alkoxyalkyl, crosslinked with divinylbenzene in an amount of from about 0.001 to about 0.04 mole of divinylbenzene per mole of maleic anhydride in said copolymer; said thickening agent having a viscosity of at least 8,600 cps. in sodium hydroxide solution at a pH of 6 to 7 at 0.2 percent by weight concentration at a temperature of 25° C. at 20 r.p.m. as measured by a Brookfield viscometer said thickening agent being produced by other process of claim 4.

2. A polymeric thickening agent as described in claim 1 wherein the vinyl alkyl ether is vinyl ethyl ether.

3. A polymeric thickening agent as described in claim 2 wherein the amount of divinylbenzene is from about 0.005 to about 0.02 mole per mole of maleic anhydride in said copolymer.

4. A process for preparing a polymeric thickening agent which comprises (1) admixing (a) maleic anhydride, (b) a vinyl alkyl ether of the formula:

$$CH_2=CH-O-R$$

wherein R is a radical containing 1 to 10 carbon atoms selected from the group consisting of alkyl, haloalkyl and alkoxyalkyl, and (c) divinylbenzene in such proportion as to provide a molar ratio of vinyl alkyl ether to maleic anhydride of at least about 2 to 1 and a molar ratio of divinylbenzene to maleic anhydride of from about 0.001 to 1 to about 0.04 to 1, (2) contacting the resulting admixture with a free-radical polymerization catalyst, and (3) recovering the polymeric product from the reaction system.

5. A process as described in claim 4 wherein the vinyl alkyl ether is vinyl ethyl ether.

6. A process as described in claim 5 wherein the molar ratio of vinyl ethyl ether to maleic anhydride is at least about 2 to 1 and the molar ratio of divinylbenzene to maleic anhydride is from about 0.005 to 1 to about 0.02 to 1.

References Cited

UNITED STATES PATENTS

| 2,923,692 | 2/1960 | Ackerman et al. | 260—17.4 |
| 2,985,625 | 5/1961 | Jones | 260—78 |
| 3,448,088 | 6/1969 | Azorlosa | 260—78.5 |

JOSEPH L. SCHOFER, Primary Examiner

J. KIGHT III, Assistant Examiner

U.S. Cl. X.R.

260—80, 76, 29.6, 30.8, 33.4; 167—85

PO-1050
(5/69)

UNITED STATES PATENT OFFICE
CERTIFICATE OF CORRECTION

Patent No. 3,530,102            Dated September 30, 1970

Inventor(s) Frank J. Welch and Herbert J. Paxton, Jr.

It is certified that error appears in the above-identified patent and that said Letters Patent are hereby corrected as shown below:

Column 1, lines 33 and 34, "anequimolar" should be "an equimolar".

Column 2, line 53, "polymeriztaion" should be "polymerization".

In the Claims:

Claim 1, line 20, delete "other" and substitute --the--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents